US00RE48237E

(19) United States
(12) Reissued Patent
Fodrocy et al.

(10) Patent Number: US RE48,237 E
(45) Date of Reissued Patent: Oct. 6, 2020

(54) UTILITY CART WITH LOCK BOX

(71) Applicant: Geerpres, Inc., Muskegon, MI (US)

(72) Inventors: Joseph J. Fodrocy, Muskegon, MI (US); Anton D. Jerovsek, Grand Haven, MI (US); Jeffrey R. Kolbe, Muskegon, MI (US); Scott E. Ribbe, West Olive, MI (US)

(73) Assignee: Geerpres, Inc., Muskegon, MI (US)

(21) Appl. No.: 16/138,295

(22) Filed: Sep. 21, 2018

Related U.S. Patent Documents

Reissue of:
(64) Patent No.: 9,452,768
Issued: Sep. 27, 2016
Appl. No.: 14/528,623
Filed: Oct. 30, 2014

(51) Int. Cl.
*B62B 3/00* (2006.01)
*E05B 65/52* (2006.01)
*B62B 5/06* (2006.01)

(52) U.S. Cl.
CPC ..... *B62B 3/004* (2013.01); *B62B 3/005* (2013.01); *B62B 5/06* (2013.01); *E05B 65/52* (2013.01); *B62B 2202/22* (2013.01); *B62B 2202/50* (2013.01)

(58) Field of Classification Search
CPC ..... B65F 1/00; B65F 1/14; B65F 1/16; B65F 2/001
See application file for complete search history.

(56) References Cited

U.S. PATENT DOCUMENTS 1,455,395 A * 5/1923 Exum ..... A47B 31/02 108/78
2,250,729 A * 7/1941 Smith ..... B65D 43/00 220/252
2,735,542 A * 2/1956 Shnitzler ..... B65D 85/54 206/228

(Continued)

FOREIGN PATENT DOCUMENTS

FR 430983 A * 10/1911 ..... B65F 1/16

OTHER PUBLICATIONS

"Consumer Crafts"; Jul. 7, 2014; https://web.archive.org/web/20140707175211/http://www.consumercrafts.com/store/details/catalog/storage-general-multi-use-organizers/5301-10.*

(Continued)

*Primary Examiner* — David O Reip
(74) *Attorney, Agent, or Firm* — Mitchell Intellectual Property Law, PLLC

(57) ABSTRACT

A utility cart with lock box which includes a fixed housing portion mounted to the top of a cart storage unit, and a rotating housing portion rotatably mounted to the fixed housing portion. The fixed housing portion includes spaced sidewalls joined to a clear see through arcuate back wall, and an open front. The rotating housing portion includes spaced sidewalls joined to a clear see through arcuate front wall, and an open back. The rotating housing portion is dimensioned such that it can be rotated rearwardly up and over the fixed housing to provide access to items stored in the fixed housing portion, or under the closed rotating housing portion. Alternatively the rotating housing can be rotated forwardly and downwardly to enclose all items in the lock box. The items located in the lock box are visible whether the box is opened or closed.

21 Claims, 6 Drawing Sheets

(56) References Cited

U.S. PATENT DOCUMENTS 2,739,730 A * 3/1956 Jonas ..... B65F 1/1484 220/350
3,229,846 A * 1/1966 Katz ..... B65F 1/16 220/252
5,460,391 A * 10/1995 Gantz ..... A47B 67/04 108/129
D372,399 S * 8/1996 Wang ..... D7/609
5,813,394 A * 9/1998 Clifford ..... A47J 37/0713 126/39 BA
5,882,097 A * 3/1999 Kohagen ..... B25H 3/023 206/372
5,899,420 A * 5/1999 Gerardi ..... B25H 3/021 220/475
7,249,771 B1 * 7/2007 Brennan ..... A47J 37/0704 280/35
8,454,036 B2 * 6/2013 Cowie ..... B25H 3/02 248/224.8
8,967,438 B2 * 3/2015 Russell ..... B25H 3/02 224/404
9,089,210 B2 * 7/2015 Kool ..... A47B 31/02
2005/0269792 A1 * 12/2005 Aronson ..... B25H 3/00 280/79.11

OTHER PUBLICATIONS

Prior to Oct. 9, 2014, Geerpres first edition on carts.
Prior to Oct. 9, 2014, Geepres second edition.
Prior to Oct. 9, 2014, Geerpres first edition both painted.
Prior to Oct. 9, 2014, Geerpres second edition on carts.
Prior to Oct. 9, 2014, Rubbermaid.
Prior to Oct. 9, 2014, Venmop.
Prior to Oct. 9, 2014, Royce Rolls.

* cited by examiner

UTILITY CART WITH LOCK BOX

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates to the field of utility carts with lock boxes. Such carts are often used as cleaning carts. They typically include a wheeled base with a storage unit mounted thereon, a handle for moving the cart and for hanging items thereon, such as waste bags, and a lock box mounted on top of the storage unit. These lock boxes typically have doors which can be locked closed, flip up tops which can be locked closed, and in one case a tambour door.

SUMMARY OF INVENTION

The utility cart of the present invention includes a lock box comprising a fixed housing portion mounted to the top of the cart storage unit, and a rotating housing portion rotatably mounted to the fixed housing portion. The fixed housing portion includes spaced sidewalls joined to [a clear see through] *an* arcuate back wall, and an open front. The rotating housing portion includes spaced sidewalls joined to a clear see through arcuate front wall, and an open back. The rotating housing portion is dimensioned such that it can be rotated rearwardly up and over the fixed housing to provide access to items stored in the fixed housing portion, or under the closed rotating housing portion. Alternatively the rotating housing can be rotated forwardly and downwardly to enclose all items in the lock box. The items located in the lock box are visible whether the box is opened or closed.

These and other features of the invention will be more fully understood and appreciated by reference to the description of the preferred embodiments and the appended drawings.

DESCRIPTION OF THE PREFERRED EMBODIMENTS

Figure 1:
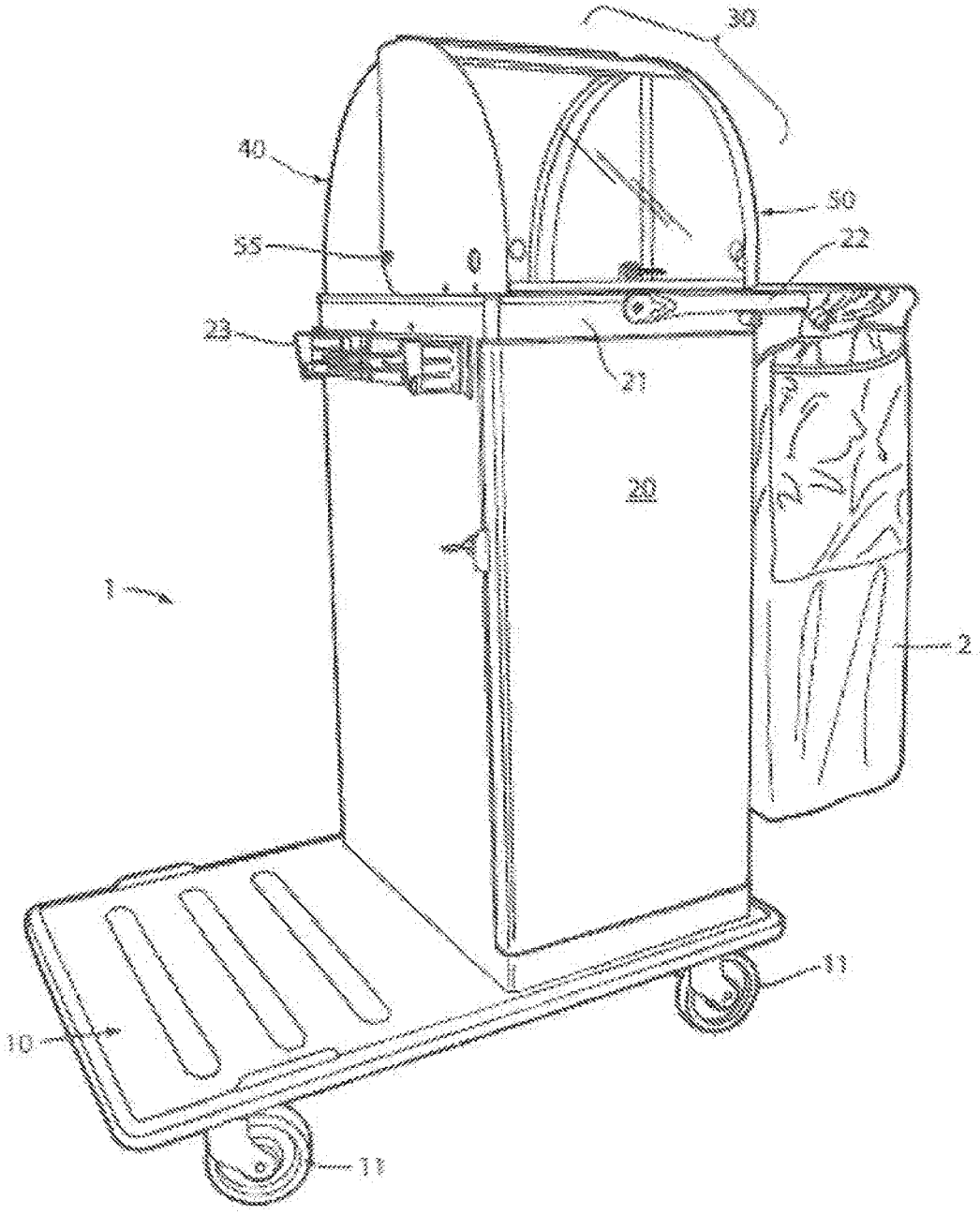
FIG. 1 is a perspective view of a preferred embodiment lock box utility cart.
Figure 2:
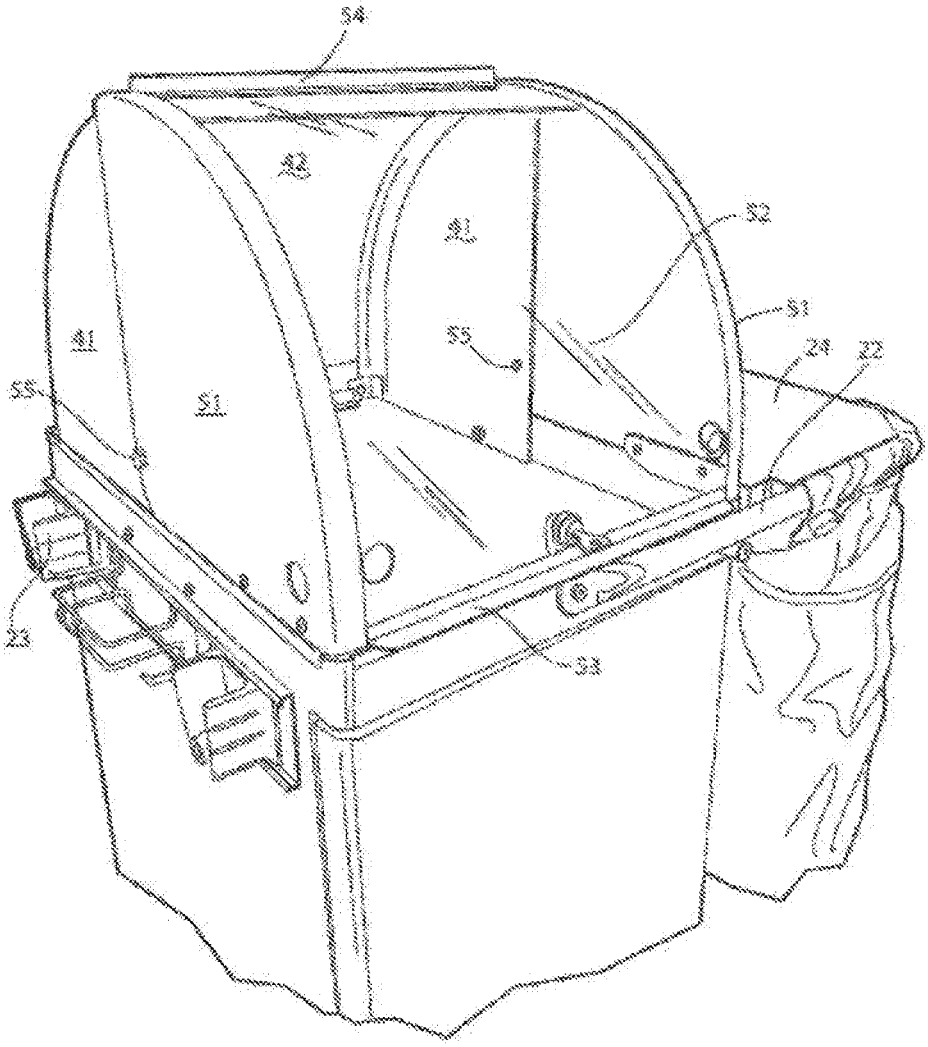
FIG. 2 is a close up front perspective view of the closed lock box mounted on the top tray of the utility cart.
Figure 3:
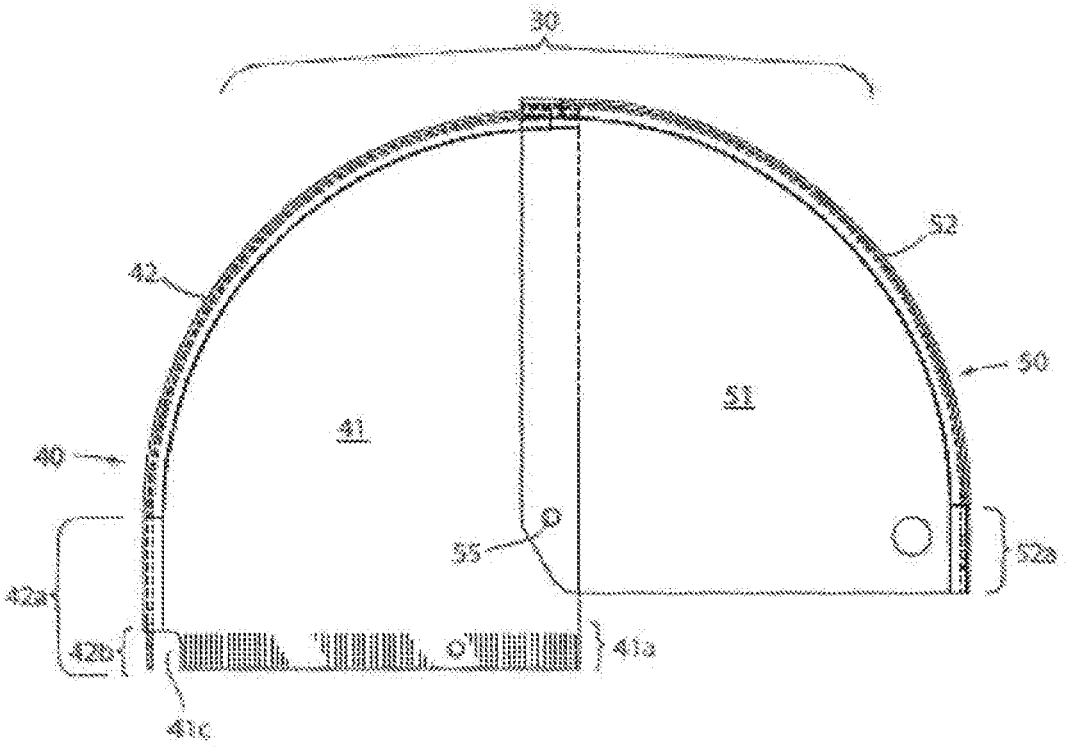
FIG. 3 is a side elevation of the assembled fixed and rotating housing portions only in closed condition.
Figure 4:
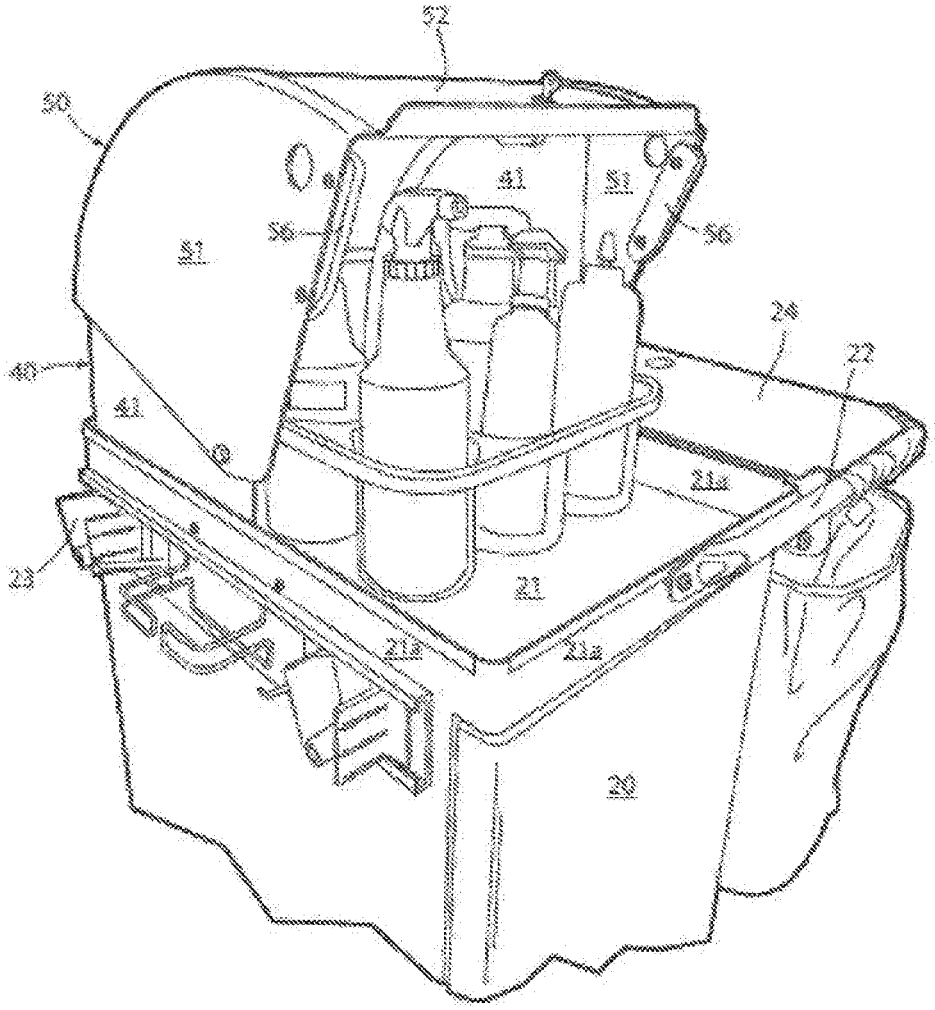
FIG. 4 is a close up front perspective view of the open lock box mounted on the top tray of the utility cart, also showing various cleaning supplies located on the top tray of the cart.
Figure 5:
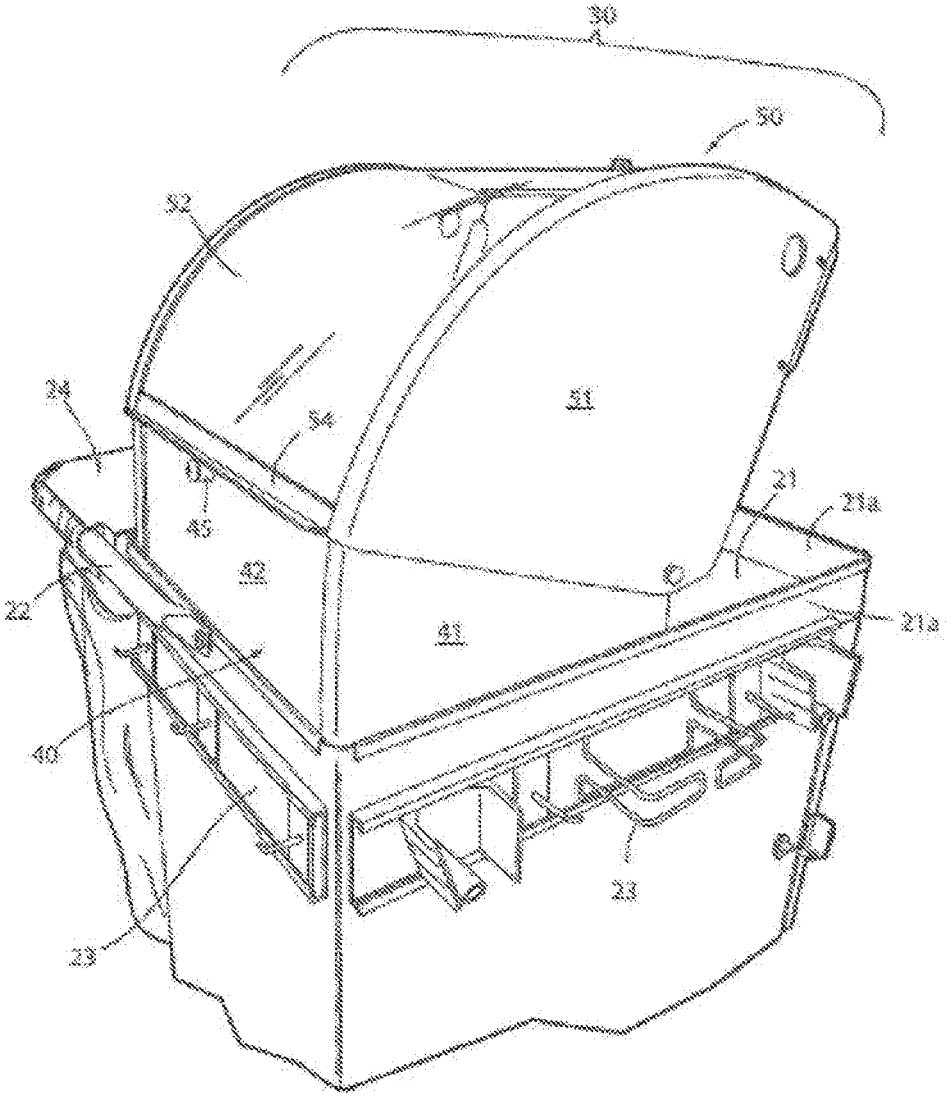
FIG. 5 is a close up rear perspective view of the lock box mounted on the top tray of the utility cart.

In the preferred embodiment, utility cart 1 has a base platform 10 with wheels 11, a storage unit 20 and a lock box 30 mounted atop storage unit 20 (FIG. 1). Lock box 30 includes a fixed housing portion 40 which is mounted to the top 21 of the cart storage unit 20, and a rotating housing portion 50 rotatably mounted to fixed housing portion 40 at axle pins 55 (FIGS. 1-3). The fixed housing portion includes spaced sidewalls 41 joined to a clear see through arcuate back wall 42, and an open front (FIGS. 2, 4 and 5). The rotating housing portion 50 includes spaced sidewalls 51 joined to a clear see through arcuate front wall 52, and an open back. Sidewalls 41 and 52 are preferably made of metal or rigid plastic, and arcuate back wall 42 and arcuate front wall 52 are preferably made of clear plastic.

Both fixed housing 40 back wall 42 and rotating housing 50 front wall 52 define about a quarter of a cylinder, except for the lower front portion 52a of front wall 52, and the lower rear portion 42a of back wall 42 (FIG. 3). Front wall portion 52a and back wall portion 42a extend generally straight down from their junction with the arcuate portions of front and rear walls 52 and 42 respectively.

The axel pins 55 pass through over lapping portions of sidewalls 51 and 41 near their rear and front edges respectively. Axel pins 55 are also located at approximately the center of the cylinder portions defined by arcuate front wall 52 and arcuate back wall 42, respectively.

Figure 6:
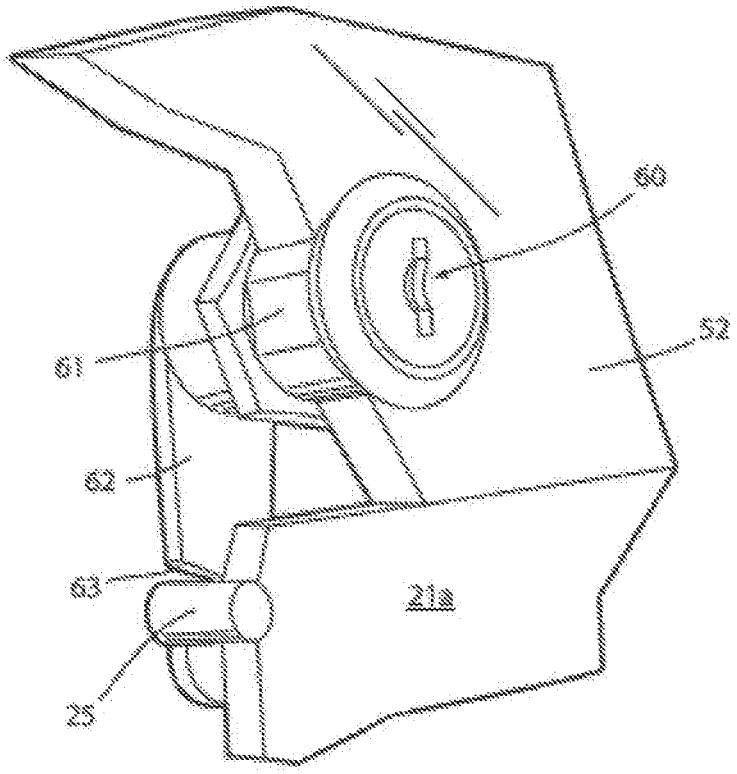
FIG. 6 is a close up of the locking mechanism of the lock box.

Rotating housing portion 50 is dimensioned just slightly larger such that it can be rotated rearwardly up and over the fixed housing 40 to open the front of fixed housing 40 and provide access to items located in the fixed housing portion (FIG. 4). This also provides access to items located in forwardly of fixed housing 40, which are enclosed under rotating housing portion when it is in its closed position. Rotating housing portion 50 can be rotated forwardly and downwardly (FIGS. 1 and 2) to close the open front of fixed housing 40, and to cover those items located outside of and forwardly of fixed housing 40. Thus all items in the lock box are thereby enclosed, and lock box 30 can be locked closed using key lock 60 (FIG. 6). The items located in the lock box are visible whether the box is opened or closed.

Platform 10 preferably extends forwardly of storage unit 20, such that a cleaning bucket and sundry other items can be carried thereon. Storage unit 20 as shown is a cabinet with a closeable door, a handle 22 projecting rearwardly therefrom and an auxiliary platform 24 located atop handle 22. Hanger brackets 23 are positioned on cabinet 20.

The top 21 of cabinet 20 comprises a tray, in that it includes an upwardly extending perimeter sidewall 21a projecting a short distance above top 21. Top 21 is sometimes referred to herein as tray 21. Referring to FIG. 3, it can be seen that sidewalls 41 of fixed housing 40 extend downwardly further than the sidewalls 51 of rotating housing 50, to define a mounting portion 41a, shown shaded in FIG. 3. Similarly, the generally straight back wall portion 42a of fixed housing 40 extends straight downwardly from the arcuate portion of back wall 42, further than the front wall 52 of rotating housing 50 extends downwardly, to provide a back wall mounting portion 42b. These lower mounting portions 41a and 42b fit down inside the perimeter tray sidewall 21a and are secured thereto, to hold fixed housing portion in place over approximately half of top 21. A notch 41c at the rear lower edge of each sidewall 41 prevents that portion of sidewall 41 from hitting the rear perimeter wall 21a of tray 20 and interfering with the insertion of rear wall mounting portion 41b into tray 20 adjacent the rear portion of perimeter wall 21a.

Rotating housing portion 50 is approximately the same shape as fixed housing portion 40, but is dimensioned just slightly larger than fixed housing 40 from sidewall to sidewall, and in the radius of its arcuate front wall, such that it can be rotated up and over fixed housing 40 as shown in FIGS. 4 and 5, or can be rotated forwardly and downwardly into its closed position as shown in FIGS. 1 and 2, with the bottom edges of sidewalls 51 and front wall 52 resting on top of tray sidewall 21a. An alignment flange 56 is secured to the inside of each rotating housing sidewall 51, and extends a short distance below the bottom edge of sidewall 51 (FIG. 4). As rotating housing 50 is lowered into its closed position, alignment flanges 56 pass down to the inside of, and closely adjacent to their adjacent portion of tray perimeter sidewall 21a. Alignment flanges 56 help align the sides 51 of rotating housing 50 relative to the top edge of perimeter wall 21a, and prevent rotary housing from wracking or shifting sideways relative to perimeter wall 21a.

A handle flange 53 of "L" shaped cross section is secured to and extends across the width of rotating housing 50 at the bottom edge thereof (FIG. 2). A similar handle flange 54 is secured to rotating housing 50 at the top edge thereof (FIG. 5). Handle 53 and 54 facilitate rotation of housing 50 between its opened and closed positions. A stop 45 projects from the back of fixed housing 40 to limit the rotation of housing 50 to its open position.

Lock 60 is located near the bottom edge of front wall 51 of rotating housing 50. Lock 60 includes a key lock locking cylinder 61 with a depending lock arm 62 having a notch 63 in the lower extremity thereof. When lock 60 is rotated to its lock position, notch 63 closes over a detent pin 25 which projects inwardly from front perimeter sidewall 21a. In this manner, rotating housing 50 can be locked in its closed position.

In use, various containers of cleaning products or other items can be placed in the top tray 21 atop storage container 20 (FIG. 4). Lock box 30 is opened by unlocking and rotating housing portion 50 to its open position, making the items in lock box 30 accessible for use. A cleaning bucket and other items can be placed on the forward portion of platform 10 and a refuse bag 2 hung from handle 22. Items can be removed from tray 21, used, temporarily located on handle platform 24, and ultimately located back on tray 21. After use, lock box 30 can be rotated closed and locked shut by lock 60, thereby denying access to items located on tray 21.

Of course, it is understood that the forgoing is a description of preferred embodiments, and that various changes can be made without departing from the spirit and broader aspects of the invention as set forth in the appended claims.

The invention claimed is:

1. A utility cart comprising:

a wheeled base;

a storage unit located on and projecting upwardly from said wheeled base to a top surface having at least two upwardly projecting spaced top sidewalls projecting upwardly a short distance from said top surface;

a lock box mounted on said top surface, said lock box including:

a first housing portion mounted on said top surface of said storage unit, and a second housing portion rotatably mounted to said first housing portion;

said first housing portion including spaced sidewalls joined to [a clear see through] *an* arcuate back wall having a first radius, and an open front;

said spaced sidewalls of said first housing being seated between and mounted to said spaced top sidewalls;

said second housing portion including spaced sidewalls joined to a clear see through arcuate front wall having a second radius, and an open back;

said second housing portion being approximately the same shape as said first housing portion, but being dimensioned just slightly larger than said first housing portion from sidewall to sidewall, and in said radius of its arcuate front wall, such that said second housing portion is configured to be rotated rearwardly up and over said first housing portion to provide access to items stored in or in front of said first housing portion, and said second housing portion being configured to be rotated forwardly and downwardly to enclose all items in said lock box, with any items located in said lock box being visible whether said lock box is opened or closed.

2. The utility cart of claim 1 in which said storage unit also includes a top back wall projecting upwardly a short distance from said top surface; said back wall of said first housing portion of said lock box extending down inside said top back wall of said storage unit.

3. The utility cart of claim 2 wherein each said sidewall of said first housing portion including a lower edge which includes a notch therein adjacent said top back wall which projects upwardly from said top surface, which prevents that portion of each said sidewall of said first housing portion from hitting said top back wall and interfering with said back wall of said first housing portion of said lock box extending down inside said top back wall of said storage unit.

4. The utility cart of claim 2 in which:

said second housing portion is rotatably mounted to said first housing portion by axle pins;

said back wall of said first housing portion of said lock box and said front wall of said second housing portion of said lock box each define about a quarter of a cylinder, said arcuate front wall being joined to a lower front wall, and said arcuate back wall being joined to a lower rear wall, and said lower front wall and said lower back wall each extend generally straight down from their junction with said arcuate front and rear walls respectively;

said sidewalls of said first housing portion having front edge portions and said sidewalls of said second housing having rear edge sidewall portions, said front edge portions of said first housing portion and said rear edge portions of said second housing portion overlapping;

said axel pins pass through said over lapping front edge portions and rear edge portions of said first and sidewalls of said second housing; and said axel pins are also located at approximately the axis of said quarter cylinders defined by said arcuate front wall and said arcuate back wall, respectively.

5. The utility cart of claim 4 in which:

a handle flange of "L" shaped cross section is secured to and extends across the width of said lower front wall of second housing portion.

6. The utility cart of claim 5 in which:

said arcuate front wall of second housing portion includes a top edge, and a second handle flange of "L" shaped cross section is secured to said arcuate front wall of said second housing portion at said top edge thereof.

7. The utility cart of claim 6 in which:

a stop projects from said back wall of said first housing portion to limit the rearward rotation of said second housing portion to its open position.

8. The utility cart of claim 7 in which:

a lock is located on said lower front wall of said second housing portion;

said lock includes a key lock locking cylinder with a depending lock arm having a notch in a lower extremity thereof;

said storage unit including a top front wall projecting upwardly a short distance from said top surface, said top front wall including a detent projecting therefrom adjacent said lock when said second housing portion is in its closed position;

said lock being rotatable to engage said notch with said detent to lock said second housing portion in its closed position.

9. A utility cart comprising:

a wheeled base;

a storage unit located on and projecting upwardly from said wheeled base to a top surface;

a lock box mounted on said top surface, said lock box including:

a first housing portion mounted on said top surface of said storage unit, and a second housing portion rotatably mounted to said first housing portion;

said first housing portion including spaced sidewalls joined to [a clear see through] *an* arcuate back wall, and an open front;

said second housing portion including spaced sidewalls joined to a clear see through arcuate front wall, and an open back;

said second housing portion being dimensioned such that said second housing portion is configured to be rotated rearwardly up and over said first housing portion to provide access to items stored in or in front of said first housing portion, and is configured to be rotated forwardly and downwardly to enclose all items in said lock box, with any items located in said lock box being visible whether said lock box is opened or closed;

said second housing portion is rotatably mounted to said first housing portion by axle pins;

said back wall of said first housing portion of said lock box and said front wall of said second housing portion of said lock box each define about a quarter of a cylinder, said arcuate front wall being joined to a lower front wall, and said arcuate back wall being joined to a lower rear wall, and said lower front wall and said lower back wall each extend generally straight down from their junction with said arcuate front and rear walls respectively;

said sidewalls of said first housing portion having front edge portions and said sidewalls of said second housing having rear edge sidewall portions, said front edge portions of said first housing portion and said rear edge portions of said second housing portion overlapping;

said axel pins pass through said over lapping front edge portions and rear edge portions of said first sidewalls of said second housing; and said axel pins are also located at approximately the axis of said quarter cylinders defined by said arcuate front wall and said arcuate back wall, respectively.

10. The utility cart of claim 9 in which:

a handle flange of "L" shaped cross section is secured to and extends across the width of said lower front wall of second housing portion.

11. The utility cart of claim 10 in which:

said arcuate front wall of second housing portion includes a top edge, and a second handle flange of "L" shaped cross section is secured to said arcuate front wall of said second housing at said top edge thereof.

12. The utility cart of claim 11 in which:

a stop projects from said back wall of said first housing portion to limit the rearward rotation of said second housing portion to its open position.

13. The utility cart of claim 12 in which:

a lock is located on said lower front wall of said second housing portion;

said lock includes a key lock locking cylinder with a depending lock arm having a notch in a lower extremity thereof;

said storage unit including a top front wall projecting upwardly a short distance from said top surface, said top front wall including a detent projecting therefrom adjacent said lock when said second housing portion is in its closed position;

said lock being rotatable to engage said notch with said detent to lock said second housing portion in its closed position.

14. The utility cart of claim 9 in which:

a stop projects from said back wall of said first housing to limit the rearward rotation of said second housing portion to its open position.

15. The utility cart of claim 9 in which:

a lock is located on said lower front wall of said second housing portion;

said lock includes a key lock locking cylinder with a depending lock arm having a notch in a lower extremity thereof;

said storage unit including a top front wall projecting upwardly a short distance from said top surface, said top front wall including a detent projecting therefrom adjacent said lock when said second housing portion is in its closed position;

said lock being rotatable to engage said notch with said detent to lock said second housing portion in its closed position.

16. A utility cart comprising:

a wheeled base;

a storage unit located on and projecting upwardly from said wheeled base to a top surface;

a lock box mounted on said top surface, said lock box including:

a first housing portion mounted on said top surface of said storage unit, and a second housing portion rotatably mounted to said first housing portion;

said first housing portion including spaced sidewalls joined to [a clear see through] *an* arcuate back wall, and an open front;

said second housing portion including spaced sidewalls joined to a clear see through arcuate front wall, and an open back;

said second housing portion being dimensioned such that said second housing portion is configured to be rotated rearwardly up and over said first housing portion to provide access to items stored in or in front of said first housing portion, and is configured to be rotated forwardly and downwardly to enclose all items in said lock box, with any items located in said lock box being visible whether said lock box is opened or closed;

said front wall of said second housing portion of said lock box having a bottom edge;

a lock being located near said bottom edge of said front wall of said second housing portion;

said lock includes a key lock locking cylinder with a depending lock arm having a notch in a lower extremity thereof;

said storage unit including a top front wall projecting upwardly a short distance from said top surface, said top front wall including a detent projecting therefrom adjacent said lock when said second housing portion is in its closed position;

said lock being rotatable to engage said notch with said detent to lock said second housing portion in its closed position.

17. A utility cart comprising:

a wheeled base;

a storage unit located on and projecting upwardly from said wheeled base to a top surface having at least two upwardly projecting spaced top sidewalls projecting upwardly a short distance from said top surface;

a lock box mounted on said top surface, said lock box including:

a first housing portion mounted on said top surface of said storage unit, and a second housing portion rotatably mounted to said first housing portion;

said first housing portion including spaced sidewalls joined to [a clear see through] *an* arcuate back wall, and an open front;

said second housing portion including spaced sidewalls joined to a clear see through arcuate front wall, and an open back;

said second housing portion being dimensioned such that said second housing portion is configured to be rotated rearwardly up and over said first housing portion to provide access to items stored in or in front of said first housing portion, and is configured to be rotated forwardly and downwardly to enclose all items in said lock box, with any items located in said lock box being visible whether said lock box is opened or closed;

each said second housing sidewall including an inside facing its said opposite sidewall, and also having a bottom edge; and an alignment flange extending from said inside of each said second housing sidewall downwardly a short distance below said bottom edge of said sidewall, such that as said second housing is lowered into its closed position, said alignment flanges pass closely adjacent to one of said top sidewalls, to help align said sidewalls of said second housing and prevent said second housing portion from wracking or shifting from side to side relative to said top sidewalls.

*18. The utility cart of claim 1 in which said arcuate back wall of said first housing comprises a clear see through arcuate back wall.*

*19. The utility cart of claim 9 in which said arcuate back wall of said first housing comprises a clear see through arcuate back wall.*

*20. The utility cart of claim 16 in which said arcuate back wall of said first housing comprises a clear see through arcuate back wall.*

*21. The utility cart of claim 17 in which said arcuate back wall of said first housing comprises a clear see through arcuate back wall.*

* * * * *